Aug. 7, 1956  J. B. BRENNAN  2,757,426
METHOD OF MAKING MOLD WITH FIBROUS LINER
Filed Oct. 3, 1951  2 Sheets-Sheet 1

INVENTOR.
JOSEPH B. BRENNAN
BY
ATTORNEYS

Aug. 7, 1956  J. B. BRENNAN  2,757,426
METHOD OF MAKING MOLD WITH FIBROUS LINER
Filed Oct. 3, 1951  2 Sheets-Sheet 2

INVENTOR.
JOSEPH B. BRENNAN
BY
West & Oldham
ATTORNEYS.

United States Patent Office 2,757,426
Patented Aug. 7, 1956

2,757,426

METHOD OF MAKING MOLD WITH FIBROUS LINER

Joseph B. Brennan, Cleveland, Ohio

Application October 3, 1951, Serial No. 249,525

5 Claims. (Cl. 22—193)

This invention relates to fibrous articles.

This invention more particularly relates to molds, cores and dies for forming thermoplastic materials and with particular reference to articles of fibrous materials used as liners in molds or dies to shape molten metal as in strip or string casting or die casting or casting in a mold.

According to my invention I make a close-fitting, self-supporting fibrous liner for molds and dies used in shaping molten metals.

The general object of this invention is to provide a novel liner for use in molding or casting operations to reduce or avoid mold wear or damage.

Another object of the invention is to provide a novel method of producing a self-supporting, accurately shaped mold liner which may be produced on one mold or form and be used on or in another mold or form.

Another object of the invention is to produce a seamless, unitary porous mold liner from accreted fibers of heat resistant material.

Further objects of the invention will be made apparent as the specification proceeds.

Reference now should be had to the accompanying drawings, wherein.

For materials in fabricating these fibrous liners I use materials which will be relatively inert at the temperatures and under the conditions of casting.

The fibrous liners are made by spraying dry fiber as of asbestos and a binder such as plaster of paris and water onto a foraminous former into a layer under vacuum if preferred and then pressing the deposited material to accurate shape. Heat can be applied also when pressing to accurately shape and finish the liner.

Thus I produce a fibrous compacted layer which is dimensionally accurate and which is made to fit into the receptacle into which the molten metal is to be placed or cast. This fibrous layer so compacted will space the molten metal placed therein from the receptacle or mold. I prefer that the receptacle for the molten metal which is a die or mold be made of porous material such as carbon, tungsten carbide or other sintered metal aggregates. Metal oxides and carbon mixes may be used also as the material of which the mold die or receptacle is made but in any case I prefer that this mold or receptacle be porous.

Another way to make the fibrous liner for molds or dies is to accrete fibers such as asbestos or fiberglass fibers onto a screen or porous former, under pressure and/or vacuum, flat or in the hollow shape desired, from a liquid suspension or spray, then press or roll the accretion, and then apply coating materials, which may be applied at any desired time in the production of the liner so as to give a smooth surface. Filters suitable are carbon, graphite, plaster of paris, zirconium oxide or other heat-resisting materials. I prefer to use heat-resisting material throughout. The finished fibrous liner should be smooth, self-supporting, porous and strong enough to withstand use and be shaped so as to accurately space the metal to be cast from the mold. In most cases the liner and spacer need be only a fraction of an inch thick and is preferably somewhat flexible. Preferably the liner will be of uniform thickness throughout, and usually it is porous throughout.

The complete mold liner is made up of a plurality of liners or liner sections which fit together to define a complete mold cavity. The individual liners are defined as of complementary irregular shape, i. e., a shape which cannot be formed by rolling or bending a flat sheet even though the mold cavity formed by the liners is of smooth symmetrical configuration.

Figure 1:
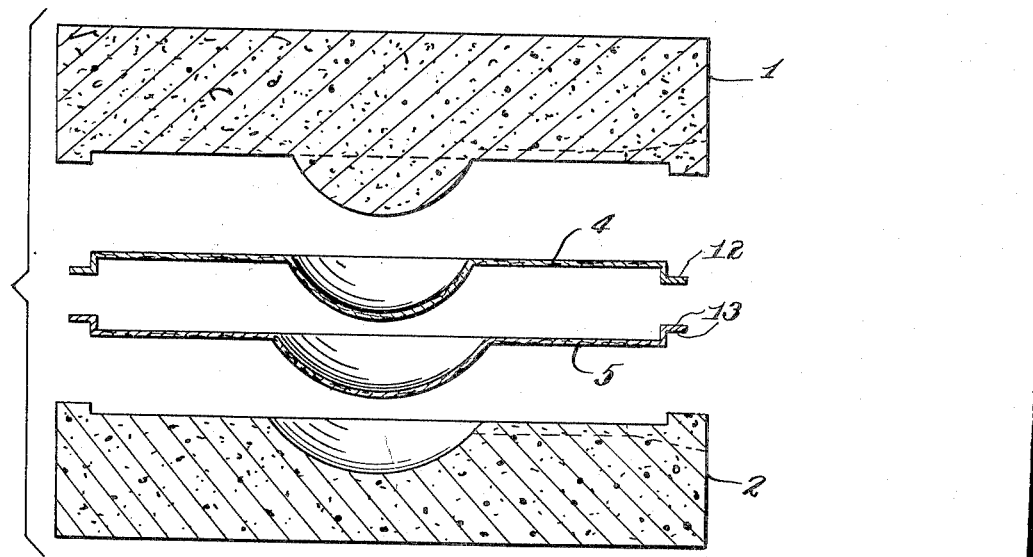
Fig. 1 is an exploded section through a mold and mold liner assembly embodying the principles of the invention.
Figure 2:
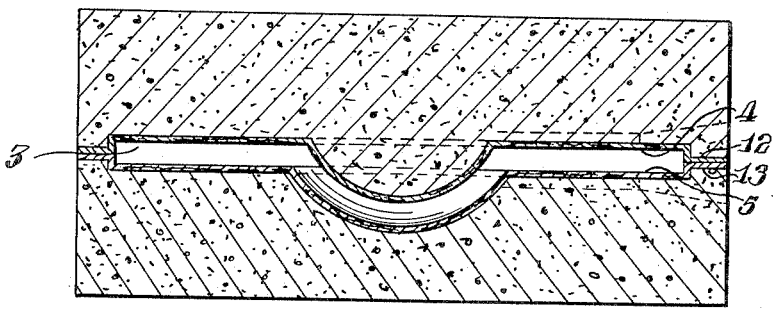
Fig. 2 is a section of the mold and liner assembly of Fig. 1 when operatively positioned.
Figure 3:
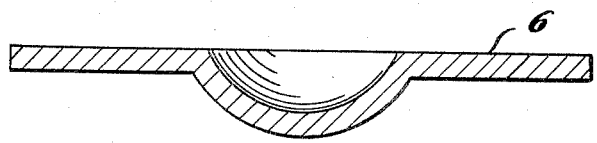
Fig. 3 is a section through the casting produced in the apparatus of Fig. 2.

In the drawings, Fig. 1 shows a two part mold made from a porous male mold section 1 and a porous female mold section 2 made from porous materials as stated. The mold sections 1 and 2 combine to define a mold cavity 3. Fig. 1 also shows that a fibrous, seamless, unitary mold liner 4 is provided and is complementary to the cavity surface of the mold section 1 while a similar mold liner 5 is complementary to the surface of the mold section 2. These mold liners 4 and 5 are accreted from suitable fibers on the mold sections 1 and 2 or other members conforming in shape thereto.

A cupped member 6 is produced by casting molten metal between the liners 4 and 5. These liners usually can be used to produce a plurality of articles before they are damaged or rendered incapable of further use.

Figure 4:
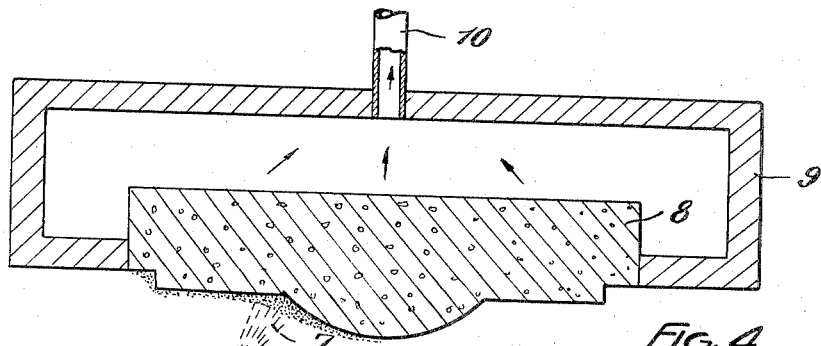
Fig. 4 is a section, partly in elevation, of one type of apparatus for producing a mold liner of the invention.
Figure 5:
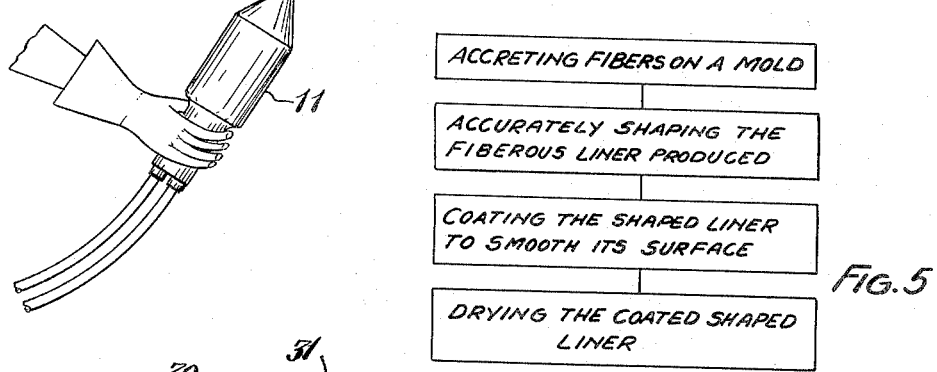
Fig. 5 is a flow diagram of a method of the invention.

One illustrative type of apparatus for use in practicing the invention is shown in Fig. 4 wherein a liquid suspension of fibers 7 are sprayed onto a porous mold section 8 similar to the mold section 1. An enclosed chamber 9 is positioned about the cavity forming part of the mold section 8 in airtight relation thereto, and a conduit 10 connects such chamber 9 to a suitable source of vacuum (not shown). Thus excess water or other liquid can be drawn from the accreted fibers. Any desired spray head 11 is used to deposit the fibers 7 on the mold and such spray head may be manually or mechanically controlled.

After deposition on a mold, the accreted fibers may be pressed to a desired accurate size, as by pressure exerted thereon by a complementary mold section. Before or after being shaped or sized, the liner may be covered with a suitable coating material, as described herein before, and then is ready for use.

The liner or spacer may be used wet or dry with a porous mold or die.

The liner or spacer may be accreted or sprayed in sheet form or hollow and it may be continuous or may be made as a separate molded article prior to application to the mold.

In continuous casting of molten metal in strip form the liners into which the metal is cast in the mold or die, preferably under pressure and/or vacuum, may be in continuous strip form and may comprise one or more strips adjacent to and covering the face of the retaining form or mold within which the molten metal passes and by which the molten strip metal is carried forward and shaped. The several strips or single hollow shape of fibrous sheet material in this case form a liner for the moving conduit for the molten metal and the strip liner moves along with the metal. The several strips of fibrous sheet material in such case can be under slight tension and locked or pinched in place by the molds or dies, and move along therewith. Rods or strips or shapes of molten metal can be cast continuously inside moving sectional molds or screens lined continuously with my fibrous liner.

The fibrous spacer can be formed by accretion on a screen or foraminous surface and then after pressing or rolling the liner the molten metal may be cast on top of or against the fibrous spacer and inside or on the foraminous surface.

When metal is to be cast between rolls for shaping the rolls should be porous and the fibrous liner or spacer can be accreted unto said rolls continuously in a layer on each roll from fiber suspension or by spray deposit, with suction or pressure prior to the casting. The rolls can be rotated in such case so that they contact an asbestos or other heat resistant fiber suspension which is deposited in a layer continuously and rolled into a smooth layer on each of a pair of porous vacuum rolls and the metal is cast between the liners of fibrous asbestos so deposited continuously and shaped as desired and the fibrous liner may leave and be stripped from the rolls with and around the metal strip or shape so cast.

The fibrous spacer or liner for molds for casting molten metal should have flanges or edges integral therewith so that these flanges or edges may be clamped or engaged by the components of the mold or die into which the metal is cast. Other holding means such as projections or ears may be made a part of the liner or spacer and are desirable. Where necessary vacuum should be applied through the porous mold or die or surface to cause adherence of the liner or spacer to the inside surface of the mold prior to and during the casting operation as well as to degas the molten metal. This vacuum can be used to remove excess liquid in accretion of the fibrous layer prior to casting of the molten material. The mold liners 4 and 5 thus are shown as provided with integral edge flanges 12 and 13, respectively, which will be engaged by the mold sections 1 and 2 when brought into engagement to aid in securing the mold liners in position.

Lubricants, such as graphite, may be applied to the liner and materials such as porous molding plaster, or powdered mica may be applied to make the liner slick. Parting compounds may also be applied.

In any case the use of such liners prevent erosion of molds or dies and prolong the life thereof when used to cast molten metal. Also they may be used to lessen or prevent thermal shock to the molds or dies and cold shotting of the cast metal is lessened also and they also lessen or prevent contamination from mold pick up.

Lubricant can be applied through the foraminous mold and liner as the metal is being cast or prior thereto or subsequently thereto. Pressure can be applied through the foraminous mold to assist in removal of the cast material as well as the liner material.

In some cases where light castings are made the porous liner itself can serve as a mold, but I prefer backing it up with a foraminous mold or screen. The foraminous backing up mold or screen is preferably made of porous metal or material such as carbon or porous heat resisting material which will withstand the heat.

A number of molds can be fastened together in alignment and fitted with a continuous fiber liner so that string casting is facilitated by my invention with less mold replacement. Also such an arrangement of molds may be lined in accordance with the invention progressively and automatically.

A double row of molds can be aligned and connected as a pair of conveyors each carrying one half of each mold in face to face alignment and having a continuous liner of fibrous asbestos deposited and accreted over the face of the porous molds by suction from a fibrous suspension or dry or wet spray deposit so that when the metal is cast no objectionable joint marks are left on the string casting so produced. The fibrous liner layer is deposited continuously inside the molds and compacted continuously and the metal is cast continuously and easily parted from the molds. The life of the molds is thereby prolonged. The inside shape of such molds can be such as to produce rounds or other shapes or individual castings. The heat resisting fibrous liner will make it possible to cast steel as well as non-ferrous metals in strings or as a wire or shape.

A groove made up by a travelling screen or multiple travelling screens or foraminous modes or sections can have the fibrous liner deposited directly by accretion from a pulp suspension in the groove and then rolled and the metal squirted therein continuously or intermittently as from a pressure crucible, or head of molten material. A roll can be used to finish and control the casting of metal so cast in a moving fibrous lined groove.

A flat foraminous band or screen or series of moving foraminous flat surfaces may have the fibrous sheet deposited thereon continuously and have the metal cast on the so-deposited sheet continuously so that a flat band of metal is produced which can be sized by a porous fiber covered roll to gauge as desired. The fibrous cover for the flat foraminous band or screen or series of moving flat surfaces and the porous roll cover can be made to part and travel with the strip metal produced by gas pressure in back of or inside the foraminous surfaces.

In certain cases the backing-up mold or enclosing mold can be made of a compacted briquette of carbon, powdered mica, or powdered metal or metal oxides or ceramic material of higher melting point than that being cast. Any powdered material can be used for the mold which will stand the heat without breakdown or distortion and which can be handled in production after being briquetted. In any case, the spacer of fibrous heat-resisting material must fit the mold snugly and prevent the foraminous mold material from coming in direct contact with the molten metal.

In certain cases a dry briquetted powdered compacted mold may be partly enclosed in a cup-shaped metal casement or flask to facilitate handling. The fibrous mold liner or spacer will prevent erosion of the dry briquetted mold which is frail.

Hollow pipes or tubes can be cast by using an inside form covered with fibrous spacer. This inside form is preferably porous and made of carbon tube or other ceramic material, rod or sections. The fibrous cover for this inside form is preferably applied continuously as by spraying and application of vacuum and accreted fiber. The molds for the outside of tubes to be cast are also porous and having a fibrous liner of heat-resisting material applied continuously in strip form if the casting is continuous or intermittently if the casting is intermittent.

Where continuous casting of tubing or rod or shapes is desired the continuous formation of the fibrous mold liner or fibrous core cover is preferably done by accretion continuously on the cores or molds or screens onto which or into which the metal is poured.

Where molds are sectionalized in many sections the fibrous liner can be integral and unitary and continuous and eliminate mold joint marks in castings produced.

Where string casting is done the liner travels with and inside the molds and is preferably made by accretion using the molds as formers for the accreted fibrous spacer or liner.

A casting machine can be built using a foraminous mold into which heat-resisting fiber is deposited as a liner layer, said liner layer so deposited being then subjected to heat and pressing by a cooperating die; then the molten metal may be cast into the so deposited liner in said foraminous mold and the casting cooled and discharged from the foraminous mold or die with the liner and the operation repeated continuously.

Figure 6:
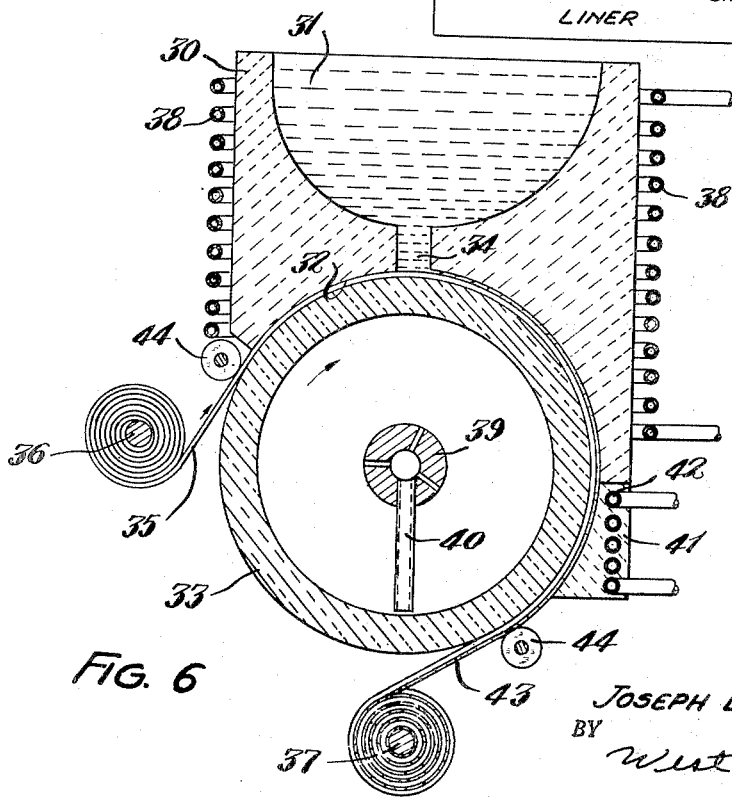
Fig. 6 is a section through apparatus for casting a continuous member by the invention.

In Fig. 6, a special crucible 30 is shown and it has molten metal 31 received therein. The lower end of the crucible 30 is specially cylindrically contoured at 32 to mate closely with a porous, cylindrical, hollow center roll 33 the surface of which is positioned thereadjacent. The metal 31 slowly flows through an aperture 34 that connects to the contoured surface 32 so that metal passing out of such aperture is forced out into a wide, thin sheet by the complementary surfaces 32 and roll 33. A porous preformed liner 35 of strip form produced as a unit in accordance with the invention is usually placed over the surfaces of the roll 33 and passes from a storage reel 36 over the roll 33 to a second storage reel 37.

In order to maintain the metal 31 molten, a high frequency induction coil 38 is placed around the crucible 30 and is connected to a suitable source of high frequency electrical energy so that flow of induced current in the metal 31 maintains it at a desired temperature. An apertured tube 39 is positioned within the roll 33 and has an extension 40 thereon that terminates adjacent the inner surface of the lowest part of the roll. The tube 39 connects to a suitable source of vacuum so that a controlled vacuum can be set up in the roll 33.

The solidification of metal on the roll 33 is facilitated by a cooling die 41 at the lower edge of the crucible 30. A cooling coil 42 is received or formed in the die 41 and connects by suitable conduits to a source of cooling fluid whereby metal on the roll 33 or liner 35 can be solidified when retained in a desired shape.

A metal strip 43 is produced in the apparatus and is wound up with the liner 33 on the reel 37. The reels 36 and 37 and roll 33 may be driven in any suitable manner. Conventional guides 44 may aid in determining the path of the liner 33 and strip 43.

It also would be possible to have the roll 33 pass through a storage tank or discharge spout so that a suspension of accreted fibers would be placed thereon in place of the liner 35. The suction set up within the roll 33 would deposit the fibers on the roll, and the heating action of the molten metal on the roll and the suction action both would dry the deposited fibers into a seamless unitary sheet of liner material.

The present application is a continuation in part of my copending application Serial No. 697,393, filed September 16, 1946, now abandoned, which is itself a continuation in part of my Patent No. 2,408,038 issued September 24, 1946. Said Patent 2,408,038 illustrates another type of apparatus that could be used for producing mold liners in accordance with the invention.

Mold liner may be preformed and fed in continuously or intermittently at entrance of mold aligning mechanism.

While several complete embodiments of the invention have been disclosed herein, it will be appreciated that modifications of these particular embodiments of the invention may be resorted to without departing from the scope of the invention as defined by the appended claims.

Having thus described my invention, what I claim is:

1. The method of casting metal comprising covering one surface of each of a plurality of porous mold bodies with an aqueous suspension of heat resistant fibers capable of resisting the temperature of the molten metal to be cast, applying a vacuum to the opposite surface of each of the mold bodies to draw liquid from the suspension through the mold body to cause the fibers to deposit on said one surface as a continuous felted liner, drying the deposited liners, placing the dried liners together while they are supported by the porous bodies to form a mold cavity, and pouring molten metal into the cavity.

2. The method of casting metal comprising covering one surface of each of a plurality of porous mold bodies with an aqueous suspension of heat resistant fibers capable of resisting the temperature of the molten metal to be cast, applying a vacuum to the opposite surface of each of the mold bodies to draw liquid from the suspension through the mold body to cause the fibers to deposit on said one surface as a continuous felted liner, coating the deposited liners with a heat resistant powdered coating material, pressing the liners to give them smooth inner surfaces, placing the liners together with their inner surfaces facing to define a mold cavity and with their outer surfaces supported by the porous bodies, and pouring molten metal into the cavity.

3. The method of casting metal comprising forming at least two felted liners each having a continuous felted surface said liners being of complementary irregular shape and formed of a heat resistant material capable of resisting the temperature of the molten metal to be cast, each of the liners having an inner surface conforming to the shape of a portion of the article to be cast, placing the plurality of liners together to form a mold cavity having the shape of the article to be cast, supporting the liners by porous supporting material conforming in shape to the outer surfaces of the liners, and pouring molten metal into the mold cavity against the inner surfaces of the liners.

4. The method of casting comprising forming a plurality of felted liners each having a continuous felted surface and of complementary irregular shape and formed of a heat resistant material capable of resisting the temperature of the molten metal to be cast, pressing the liners to compact them into porous pieces each having a smooth inner surface conforming in shape to the shape of a portion of the article to be cast, placing the liners together to form a mold cavity having the shape of the article to be cast, supporting the liners by porous supporting bodies conforming in shape to the outer surfaces of the liners, and pouring molten metal into the mold cavity against the inner surfaces of the liners.

5. The method of casting comprising forming a plurality of felted liners each having a continuous felted surface and of complementary irregular shape and formed of a heat resistant material capable of resisting the temperature of the molten metal to be cast, coating the inner surfaces of the liners with a parting material, pressing the liners to compact them into porous pieces and to form their inner surfaces into smooth coated surfaces each conforming in shape to the shape of a portion of the article to be cast, placing the liners together to form a mold cavity having the shape of the article to be cast, supporting the liners by porous supporting bodies conforming in shape to the outer surfaces of the liners, and pouring molten metal into the cavity against the inner surfaces of the liners.

References Cited in the file of this patent

UNITED STATES PATENTS

| Number | Name | Date |
| --- | --- | --- |
| 359,483 | Whitley | Mar. 15, 1887 |
| 661,143 | Grasser | Nov. 6, 1900 |
| 665,865 | Baker | Jan. 15, 1901 |
| 1,265,162 | Ayerst | May 7, 1918 |
| 1,396,834 | Hall | Nov. 15, 1921 |
| 1,752,040 | Traut | Mar. 25, 1930 |
| 2,079,667 | Swift | May 11, 1937 |
| 2,269,455 | Hagemeyer | Jan. 13, 1942 |
| 2,319,267 | Sawyer | May 18, 1943 |
| 2,351,482 | Campbell | June 13, 1944 |
| 2,363,695 | Ruppik | Nov. 28, 1944 |
| 2,394,394 | Miller | Feb. 5, 1946 |
| 2,410,837 | Peters | Nov. 12, 1946 |
| 2,507,068 | Underwood | May 9, 1950 |
| 2,513,101 | Olsen et al. | June 27, 1950 |